United States Patent
Marupaduga

(10) Patent No.: US 12,133,174 B2
(45) Date of Patent: *Oct. 29, 2024

(54) WIRELESS ACCESS NODE UPLINK POWER CONTROL BASED ON UPLINK ERROR RATE

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,437

(22) Filed: Jul. 31, 2023

(65) Prior Publication Data

US 2023/0413184 A1    Dec. 21, 2023

Related U.S. Application Data

(63) Continuation of application No. 17/576,414, filed on Jan. 14, 2022, now Pat. No. 11,758,484, which is a
(Continued)

(51) Int. Cl.
*H04W 52/14* (2009.01)
*H04B 17/318* (2015.01)
*H04L 1/1812* (2023.01)
*H04L 1/20* (2006.01)
*H04W 80/02* (2009.01)
*H04W 88/08* (2009.01)
*H04W 88/14* (2009.01)

(52) U.S. Cl.
CPC ........ *H04W 52/146* (2013.01); *H04B 17/318* (2015.01); *H04L 1/1819* (2013.01); *H04L 1/203* (2013.01); *H04W 80/02* (2013.01); *H04W 88/085* (2013.01); *H04W 88/14* (2013.01)

(58) Field of Classification Search
CPC . H04W 52/146; H04W 88/14; H04W 52/241; H04W 52/245; H04B 17/318; H04L 1/203

See application file for complete search history.

(56) References Cited

U.S. PATENT DOCUMENTS 6,850,771 B2    2/2005    Malladi et al.
6,983,166 B2 *  1/2006    Shiu .................... H04W 52/267
                                                                455/127.1

(Continued)

FOREIGN PATENT DOCUMENTS

WO        2015087173 A1    6/2015

*Primary Examiner* — Fahmida S Chowdhury

(57) ABSTRACT

A wireless access node controls the transmit power of wireless User Equipment (UEs). The wireless access node determines individual uplink signal strengths for the individual wireless UEs. The wireless access node determines individual uplink error rates for the individual wireless UEs. The wireless access node determines individual power instructions for the individual wireless UEs based on their individual uplink signal strengths and their individual uplink error rates. The wireless access node transfers the individual power instructions to the individual wireless UEs. The individual wireless UEs control their transmit power responsive to the individual power instructions.

20 Claims, 7 Drawing Sheets

Related U.S. Application Data continuation of application No. 16/823,996, filed on Mar. 19, 2020, now Pat. No. 11,277,800.

(56) References Cited

U.S. PATENT DOCUMENTS

| | | |
|---|---|---|
| 7,340,267 B2 | 3/2008 | Budka et al. |
| 8,139,534 B2 | 3/2012 | Goto et al. |
| 8,509,836 B2 | 8/2013 | Shin et al. |
| 8,830,904 B2 | 9/2014 | Kim et al. |
| 9,246,651 B2 | 1/2016 | Guo et al. |
| 9,872,221 B2 * | 1/2018 | Dahlen ........... H04W 36/00835 |
| 11,057,839 B1 * | 7/2021 | Saha ..................... H04W 52/50 |
| 2007/0173278 A1 * | 7/2007 | Yoon ................. H04W 52/146 |
| | | 455/522 |
| 2007/0173280 A1 | 7/2007 | Nakayauchi et al. |
| 2012/0015659 A1 | 1/2012 | Kalyani et al. |
| 2013/0343317 A1 * | 12/2013 | Etemad ................ H04L 1/0026 |
| | | 370/328 |
| 2015/0289276 A1 * | 10/2015 | Goussard .......... H04W 72/0473 |
| | | 370/252 |
| 2018/0242258 A1 * | 8/2018 | Jönsson .............. H04W 52/283 |
| 2018/0294903 A1 * | 10/2018 | Goodman ............... H04L 45/22 |
| 2018/0376429 A1 | 12/2018 | Islam et al. |
| 2019/0137553 A1 * | 5/2019 | Mehrhoff ................ G06F 17/40 |
| 2019/0341970 A1 | 11/2019 | Lange |
| 2020/0120716 A1 | 4/2020 | He |
| 2020/0153506 A1 * | 5/2020 | Linnartz ............. H05B 47/195 |
| 2020/0229107 A1 | 7/2020 | Venkatasubramanian et al. |

* cited by examiner

WIRELESS ACCESS NODE UPLINK POWER CONTROL BASED ON UPLINK ERROR RATE

RELATED CASES

This United States patent application is a continuation of U.S. patent application Ser. No. 17/576,414 that was filed on Jan. 14, 2022 and is entitled "WIRELESS ACCESS NODE UPLINK POWER CONTROL BASED ON UPLINK ERROR RATE." U.S. patent application Ser. No. 17/576,414 is hereby incorporated by reference into this United States patent application. U.S. patent application Ser. No. 17/576,414 is a continuation of U.S. Pat. No. 11,277,800 B1 that was filed on Mar. 19, 2020 and is entitled "WIRELESS ACCESS NODE UPLINK POWER CONTROL BASED ON UPLINK ERROR RATE." U.S. Pat. No. 11,277,800 B1 is hereby incorporated by reference into this United States patent application.

TECHNICAL BACKGROUND

Wireless communication networks provide wireless data services to wireless user devices. The wireless data services include internet-access, media-streaming, machine communications, and the like. Exemplary wireless user devices comprise phones, computers, wearable transceivers, vehicles, robots, and sensors. The wireless communication networks have wireless access nodes that exchange wireless signals with the wireless user devices over radio frequencies using wireless network protocols. Exemplary wireless network protocols include Long Term Evolution (LTE) and Fifth Generation New Radio (5GNR).

The wireless user devices transmit data over wireless uplinks using various transmit powers. The wireless user devices control their uplink transmit powers in response to transmit power instructions from the wireless access nodes. A given wireless access node determines uplink signal strength, noise, and interference for a wireless UE. The wireless access node determines the desired transmit power for the wireless UE based on the uplink signal strength, noise, and interference. The wireless access node attempts to maintain the received signal strength at a common level for all UEs. The wireless access node transfers the transmit power instructions to the wireless UE. The wireless UE transfers uplink data to the wireless access node using the transmit power specified by the transmit power instructions.

The wireless access nodes perform error correction on the uplink data. The error correction entails the wireless access nodes checking the received uplink data, and the wireless user devices retransmitting some of the uplink data. The ratio of retransmitted data to total transferred data is the error rate. Unfortunately, current wireless access nodes do not use the error rates to optimize the transmit power for the wireless UEs.

TECHNICAL OVERVIEW

In some examples, the transmit power of wireless User Equipment (UEs) is controlled. Individual uplink signal strengths for individual wireless UEs is determined. Individual uplink error rates for the individual wireless UEs is determined. Individual power instructions for the individual wireless UEs is determined based on the individual uplink signal strengths and the individual uplink error rates. The individual power instructions are transferred to the individual wireless UEs. The individual wireless UEs control their transmit power responsive to the individual power instructions. In some examples, a non-transitory computer-readable media comprises instructions that direct circuitry to control the transmit power of the wireless UEs by performing the method.

In some examples, a wireless access node controls transmit power of wireless UEs. The wireless access node comprises a radio and a Baseband Unit (BBU). The radio wirelessly receives uplink signals from the wireless UEs. The BBU determines individual uplink signal strengths for the individual wireless UEs based on the uplink signals. The BBU determines individual uplink error rates for the individual wireless UEs based on the uplink signals. The BBU determines individual power instructions for the individual wireless UEs based on the individual uplink signal strengths and the individual uplink error rates. The radio wirelessly transfers the individual power instructions to the individual wireless UEs. The individual wireless UEs control their transmit power responsive to the individual power instructions.

DETAILED DESCRIPTION

Figure 1:
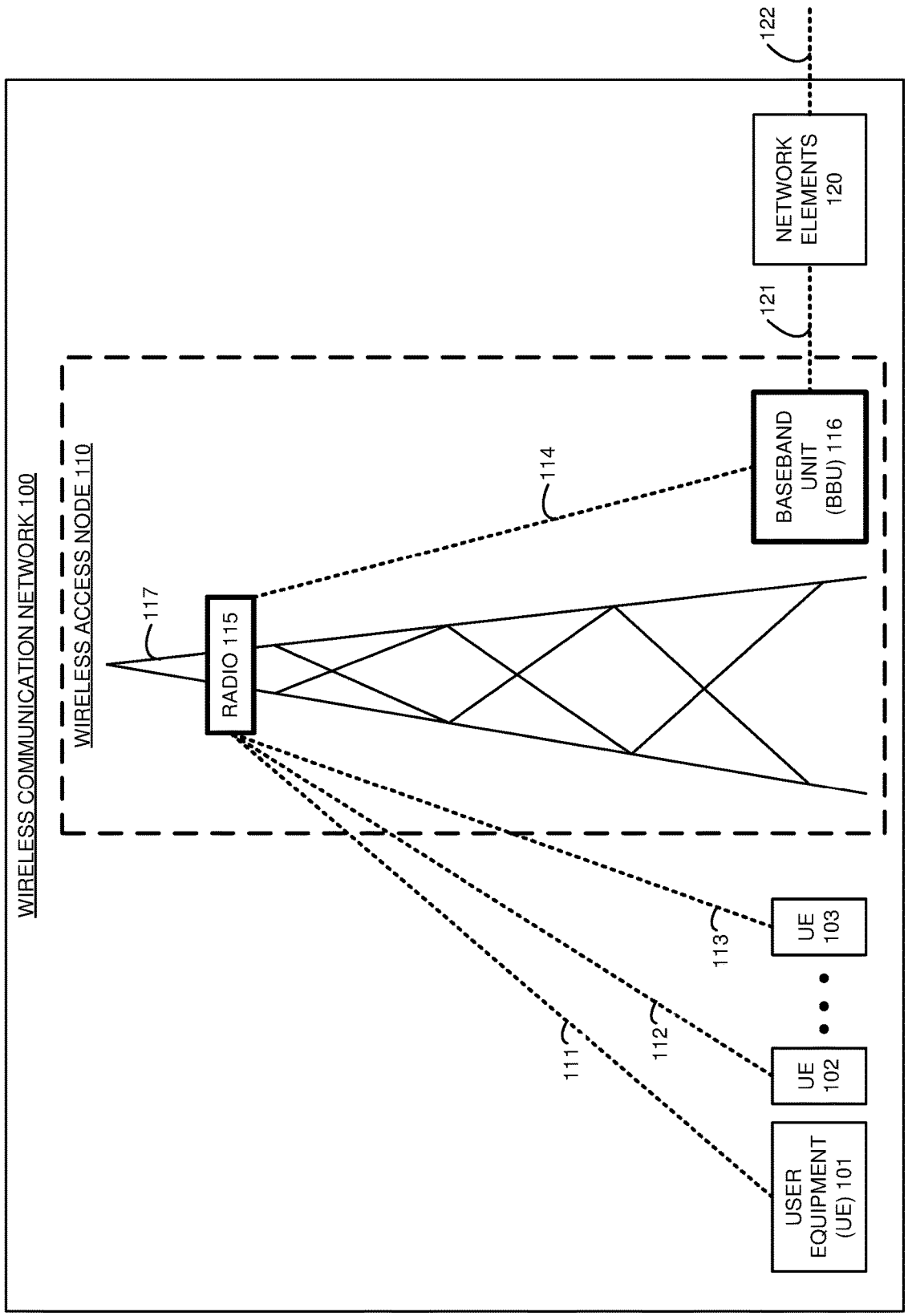
FIG. 1 illustrates a wireless communication network comprising a wireless access node that controls the uplink transmit power of wireless User Equipment (UEs) based on uplink error rate.

FIG. 1 illustrates wireless communication network 100 comprising wireless access node 110 that controls the uplink transmit power of wireless User Equipment (UEs) 101-103 based on uplink error rate. Wireless communication network 100 supports wireless data services like internet-access, media-streaming, messaging, machine-control, machine-communications, and/or some other wireless data product. Wireless communication network 100 comprises UEs 101-103, wireless access node 110, and network elements 120. Wireless access node 110 comprises radio 115, Baseband Unit (BBU) 116, radio link 114, and structure 117.

UE 101 and radio 115 are coupled over wireless link 111. UE 102 and radio 115 are coupled over wireless link 112. UE 103 and radio 115 are coupled over wireless link 113. Wireless links 111-113 use frequencies in the low-band, mid-band, high-band, or some other part or the wireless electromagnetic spectrum. Wireless links 111-113 use wireless protocols like Fifth Generation New Radio, (5GNR), Long Term Evolution (LTE), Low-Power Wide Area Network (LP-WAN), Institute of Electrical and Electronic Engineers (IEEE) 802.11 (WIFI), or some other networking technology. BBU 116 and network elements 120 are coupled over backhaul links 121. Network elements 120 and other systems like the internet are coupled over data links 122. Links 121-122 use Time Division Multiplex (TDM), IEEE 802.3 (ETHERNET), Internet Protocol (IP), Data Over Cable System Interface Specification (DOCSIS), LTE, 5GNR, virtual switching, radio tunneling protocols, and/or some other networking protocols.

Radio 115 could be a 5GNR radio, LTE radio, WIFI radio, LP-WAN radio, and/or some other type of wireless transceiver. Radio 115 comprises antennas, filters, amplifiers, analog-to-digital interfaces, microprocessors, memory, software, transceivers, bus circuitry, and the like. The microprocessors comprise Digital Signal Processors (DSP), Central Processing Units (CPUs), Graphical Processing Units (GPUs), Application-Specific Integrated Circuits (ASICs), and/or the like. The memories comprise Random Access Memory (RAM), flash circuitry, disk drives, and/or the like. The memories store software like operating systems and radio applications. The microprocessors read the software from the memories and execute the software to direct wireless communications with UEs 101-103 and to direct access communications with BBU 116.

BBU 116 could be a 5GNR BBU, LTE BBU, WIFI BBU, LP-WAN BBU, and/or some other type of node controller. BBU 116 comprises microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like operating systems and network applications. The microprocessors read the software from the memories and execute the software to direct the access communications with radio 115 and to direct network communications with network elements 120.

Radio 115 and BBU 116 are coupled over radio link 114. Radio link 114 comprises glass, metal, air or some other communication media. Radio link 114 uses Common Public Radio Interface (CPRI) or some other radio interface protocol. Radio 115 is mounted on structure 117. Structure 117 is typically a tower, but other structures like buildings or poles could be used. Structure 117 is omitted in examples like desktop femtocells, mobile hotspots, and the like.

UEs 101-103 could be phones, computers, vehicles, or some other apparatus with wireless communication circuitry. UEs 101-103 comprise radios and user circuitry. The radios comprise antennas, filters, amplifiers, analog-to-digital interfaces, microprocessors, memory, software, transceivers, bus circuitry, and the like. The user circuitry comprises user interfaces, microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like operating systems, user applications, network applications, and radio applications. The microprocessors read the software from the memories and execute the software to direct wireless communications with radio 115 and to direct user communications through the user interfaces with machines and/or humans.

Network elements 120 comprise microprocessors, memory, software, transceivers, bus circuitry, and the like. The microprocessors comprise DSP, CPUs, GPUs, ASICs, and/or the like. The memories comprise RAM, flash circuitry, disk drives, and/or the like. The memories store software like network functions. The microprocessors read the software from the memories and execute the software to direct the network communications with BBU 116 and to direct external communications over data links 122. Exemplary network elements 120 include access nodes, gateways, routers, servers, access/mobility managers, databases, firewalls, and the like.

In operation, radio 115 wirelessly receives uplink data from the wireless UE 101 over wireless link 111. Radio 115 transfers the uplink data to BBU 116 over radio link 114. BBU 116 receives the uplink data from radio 115 and responsively performs uplink error correction on the uplink data. The uplink error correction entails BBU 116 checking the uplink data for accuracy and obtaining the retransmission of missing or garbled uplink data from UE 101. BBU 116 transfers the corrected uplink data to network elements 120 over backhaul links 121. Network elements 121 transfer the corrected uplink data to external systems over data links 122. BBU 116 determines the individual received signal strength for wireless UE 101. For example, radio 115 converts wireless signals from UE 101 into digital data that indicates user data and radio characteristics. BBU 116 processes the radio characteristics to determine the received power of the uplink signals wirelessly transmitted by UE 101.

BBU 116 determines an individual power instruction for wireless UE 101 based on the uplink error rate and the received signal strength for UE 101. BBU 116 usually raises the transmit power for UE 101 when the received signal strength goes down and lowers the transmit power for UE 101 when the received signal strength goes up. BBU 116 adjusts the transmit power level upward when the error rate for UE 101 goes up. BBU 116 adjusts the transmit power level downward when the error rate for UE 101 goes down. BBU 116 transfers the power instruction to radio 115. Radio 115 wirelessly transfers the power instruction to wireless UE 101. UE 101 controls its uplink transmit power in response to the power instruction.

In some examples, BBU 116 also determines uplink backhaul throughput over backhaul links 121 for all UEs 101-103. The backhaul throughput could be average bytes per second, a percent of maximum data rate, or some other data transfer metric. For the power instruction for UE 101, BBU 116 adjusts the transmit power level upward when the uplink backhaul throughput rate for UEs 101-103 goes up. BBU 116 adjusts the transmit power level downward for UE 101 when the uplink backhaul throughput for UEs 101-103 goes down.

In a similar manner, wireless access node 110 receives data from UEs 102-103, corrects errors for UEs 102-103, and transfers the corrected data to network elements 120. Wireless access node 110 determines received signal strengths and uplink error rates for UEs 102-103. Wireless access node 110 determines individual power instructions for UEs 102-103 based on their received signal strengths, uplink error rates, and possibly the uplink backhaul throughput. Wireless access node 110 transfers the power instructions to UEs 102-103. UEs 102-103 control their uplink transmit power in response to the power instructions.

Figure 2:
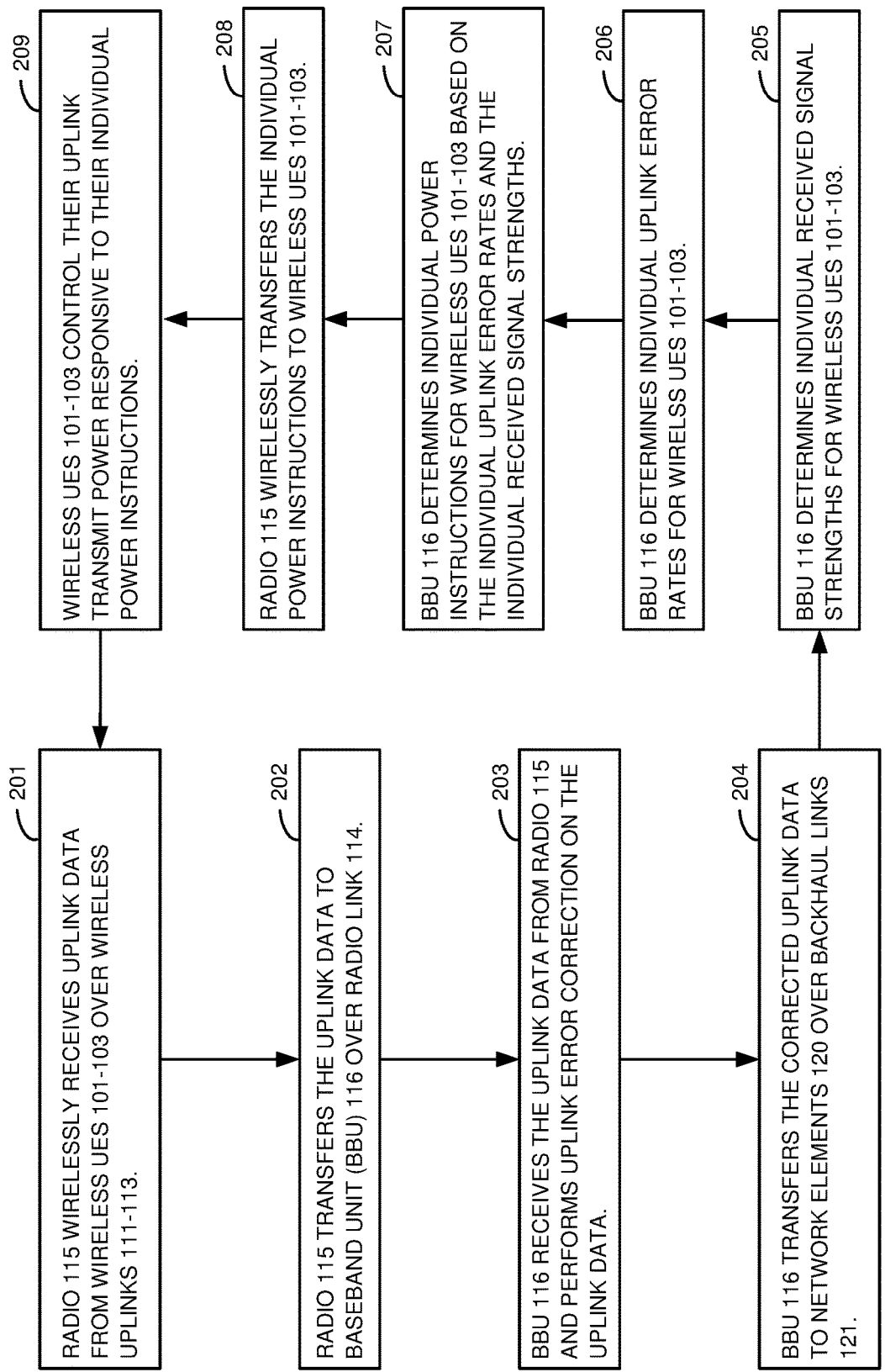
FIG. 2 illustrates the operation of the wireless communication network to control the uplink transmit power of the wireless UEs based on uplink error rate.

FIG. 2 illustrates the operation of wireless communication network 100 to control the uplink transmit power of wireless UEs 101-103 based on their uplink error rates. Radio 115 wirelessly receives uplink data from wireless UEs 101-103 over wireless links 111-113 (201). Radio 115 transfers the uplink data to BBU 116 over radio link 114 (202). BBU 116 receives the uplink data from radio 115 and performs uplink error correction on the uplink data (203). BBU 116 transfers the corrected uplink data to network elements 120 over backhaul links 121 (204). BBU 116 determines the individual received signal strengths for wireless UEs 101-103 (205). BBU 116 determines the individual uplink error rates for wireless UEs 101-103 based on the uplink error correction (206). BBU 116 determines individual power instructions for wireless UEs 101-103 based on their individual uplink error rates and received signal strengths (207). BBU 116 transfers the power instructions to radio 115 (208). Radio 115 wirelessly transfers the individual power instructions to their corresponding wireless UEs 101-103 (209). UEs 101-103 control their uplink transmit power in response to their power instruction. The operation repeats (201).

Figure 3:
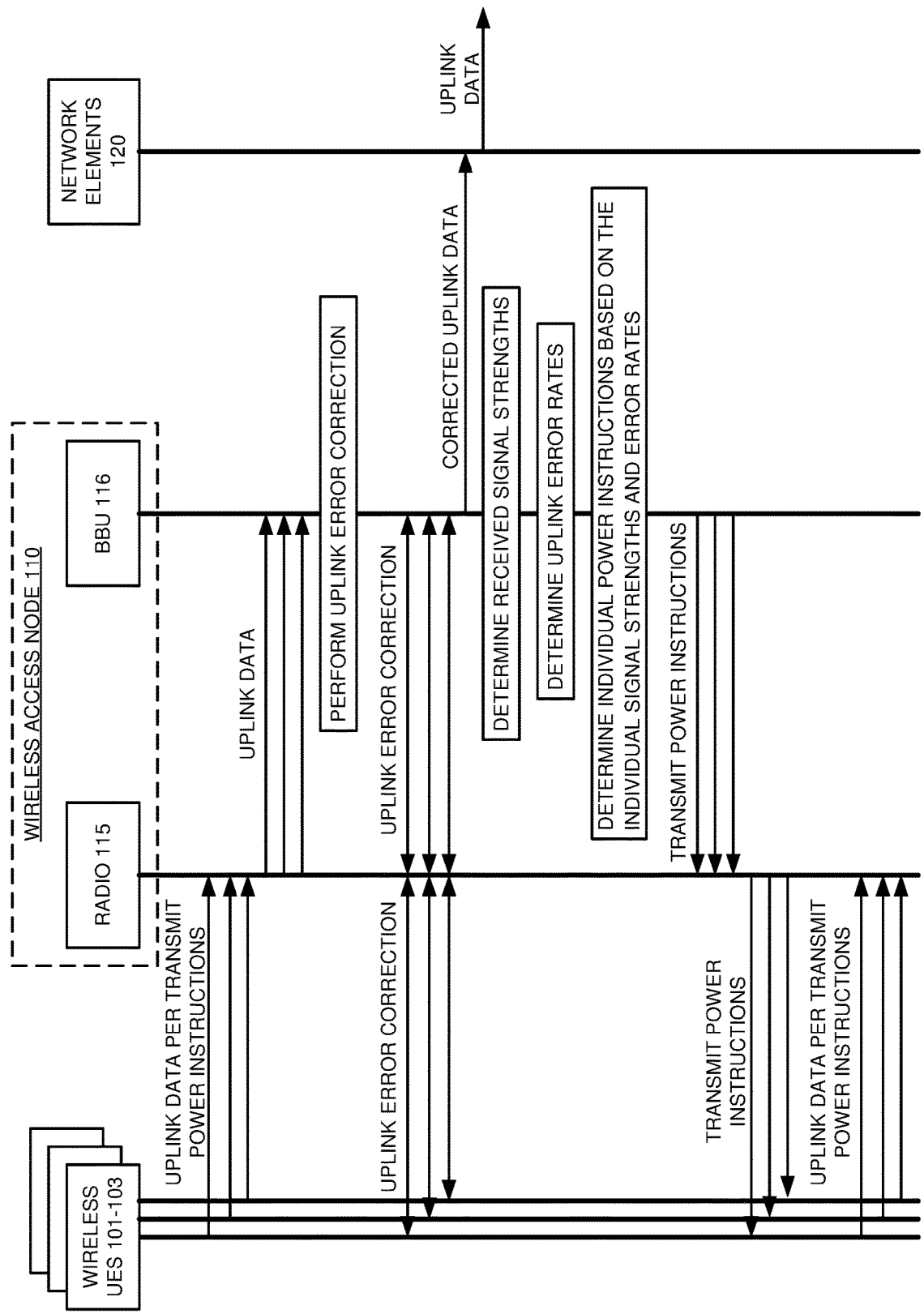
FIG. 3 illustrates the operation of the wireless communication network to control the uplink transmit power of the wireless UEs based on uplink error rate.

FIG. 3 illustrates the operation of wireless communication network 100 to control the uplink transmit power of wireless UEs 101-103 based on their uplink error rates. Radio 115 wirelessly receives uplink data from wireless UEs 101-103. Radio 115 transfers the uplink data to BBU 116. BBU 116 performs uplink error correction on the uplink data. The error correction entails the transfer of signaling and the retransmission of uplink data from UEs 101-103 to BBU 116 over radio 115. BBU 116 transfers the corrected uplink data to network elements 120. BBU 116 determines the individual received signal strengths for wireless UEs 101-103. BBU 116 determines the individual uplink error rates for wireless UEs 101-103. BBU 116 determines individual power instructions for wireless UEs 101-103 based on their individual uplink error rates and received signal strengths. BBU 116 transfers the power instructions to radio 115. Radio 115 wirelessly transfers the individual power instructions to their corresponding wireless UEs 101-103. UEs 101-103 transmit subsequent uplink data at their specified transmit powers in response to the power instructions.

Advantageously, wireless access node 110 uses the error rates and possibly backhaul throughput to optimize the uplink transmit power for wireless UEs 101-103. Additional uplink transmit power is allocated to individual UEs 101-103 when their error rate is causing too many retransmissions over the wireless uplink and/or the backhaul uplink. The additional transmit power typically brings the error rate and backhaul throughput down to more acceptable levels.

Figure 4:
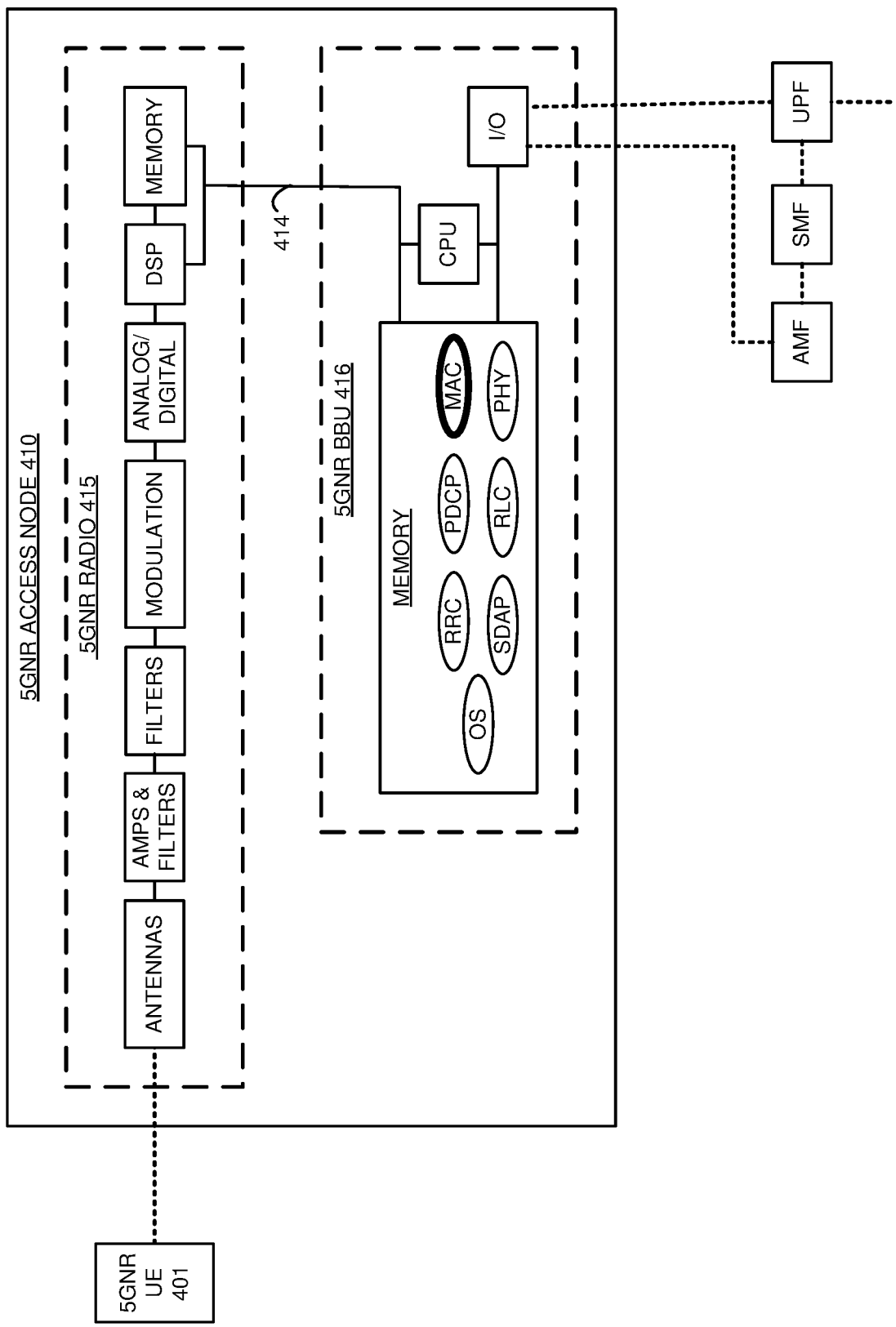
FIG. 4 illustrates a Fifth Generation New Radio (5GNR) access node that controls the uplink transmit power of a wireless UE based on uplink error rate and backhaul throughput.

FIG. 4 illustrates Fifth Generation New Radio (5GNR) access node 410 that controls the uplink transmit power of wireless UE 401 based on uplink error rate and backhaul throughput. 5GNR access node 410 is an example of wireless access node 110, although node 110 may differ. 5GNR access node 410 comprises 5GNR radio 415 and 5GNR BBU 416 that are coupled over Common Public Radio Interface (CPRI) link 414. 5GNR radio 415 comprises antennas, amps, filters, modulation, analog-to-digital interfaces, DSP, and memory that are coupled over bus circuitry. 5GNR BBU 416 comprises memory, CPU, and data Input/Output (I/O) that are coupled over bus circuitry.

In 5GNR BBU 416, the memory stores operating systems (OS), Physical Layer (PHY), Media Access Control (MAC), Radio Link Control (RLC), Packet Data Convergence Protocol (PDCP), Service Data Adaptation Protocol (SDAP), and Radio Resource Control (RRC). The CPU in BBU 416 executes the operating systems, PHY, MAC, RLC, PDCP, SDAP, and RRC to drive the exchange of 5GNR/N3 data between 5GNR UE 401 and the UPF. The CPU in BBU 416 executes the operating systems, PHY, MAC, RLC, PDCP, and RRC to drive the exchange of N1 signaling between 5GNR UE 401 and the AMF and the exchange of N2 signaling between 5GNR access node 410 and the AMF.

In 5GNR radio 415 the antennas receives wireless signals from 5GNR UE 401 that transport uplink 5GNR signaling and uplink 5GNR data. The antennas transfer corresponding electrical uplink signals through duplexers and amps that boost the received uplink signals. The filters attenuate unwanted energy. Demodulators down-convert the uplink signals from their carrier frequencies. The analog/digital interfaces convert the analog uplink signals into digital uplink signals for the DSP. The DSP recovers uplink symbols from the uplink digital signals. The DSPs transfer the uplink symbols to BBU 416 over CPRI link 414. In BBU 416, the CPU executes the network applications to process the uplink symbols and recover the uplink 5GNR data and uplink 5GNR signaling.

The network applications process reference signals in the uplink 5GNR signaling to determine received signal strength for 5GNR UE 401. The network applications process the uplink 5GNR signaling and downlink N2/N1 signaling to generate new uplink N2/N1 signaling and new downlink 5GNR signaling. In particular, the network applications perform error correction and determine error rates. The network applications generate and transfer power control instructions to 5GNR UE 401. The network applications transfer the new uplink N2/N1 signaling to the AMF over the data I/O and backhaul links. The network applications transfers the uplink N3 data to the UPF over the data I/O and backhaul links.

The network applications receive the downlink N2/N1 signaling from the AMF over the data I/O and backhaul links. The network applications receive downlink N3 data from the UPF over the data I/O and backhaul links. The network applications process the uplink 5GNR signaling and the downlink N2/N1 signaling to generate new uplink N2/N1 signaling and new downlink 5GNR signaling. The network applications process the new downlink 5GNR signaling and corresponding downlink 5GNR data to generate corresponding downlink symbols in the frequency domain. The network applications transfer the downlink symbols to 5GNR radio 415 over CPRI links 414. In 5GNR radios 415, the DSP processes the downlink symbols to generate corresponding digital signals for the analog-to-digital interfaces. The analog-to-digital interfaces convert the digital downlink signals into analog downlink signals for modulation. Modulation up-converts the downlink signals to their carrier frequencies. The filters attenuate unwanted out-of-band energy and transfer the filtered downlink signals through duplexers to amps which boost the filtered downlink signals. The electrical downlink signals drive the antenna to emit corresponding wireless signals that transport the downlink 5GNR signaling and downlink 5GNR data to 5GNR UE 401.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

In 5GNR BBU 416, the network applications exchange 5GNR signaling with 5GNR UE 401 over 5GNR radio 415. The network applications also exchange N2/N1 signaling with the AMF over backhaul links. The AMF drives the UPF over the SMF to serve data bearers to 5GNR UE 401. In 5GNR BBU 416, the network applications receive uplink 5GNR data from 5GNR UE 401 over 5GNR radio 415. The network applications transfer corresponding uplink N3 data to the UPF over the data bearers. The UPF transfers at least some of the uplink data to external systems.

In BBU 416, the network applications perform uplink Hybrid Automatic Repeat Request (HARQ) error correction on the uplink data. The HARQ error correction entails the network applications parity-checking uplink data blocks and transferring Acknowledgements (ACKS) for the successfully received uplink data blocks. 5GNR UE 401 retransmits data blocks that are not acknowledged. The network applications in BBU 416 may also check the sequence numbering in the uplink data blocks and request the retransmission of data blocks that are missing from the sequence. The network applications transfer corrected uplink N3 data to the UPF over that data bearers that traverse the backhaul links. The network applications determine the individual HARQ Block Error Rate (BLER) for 5GNR UE 401 based on the uplink HARQ. The HARQ BLER comprises a ratio of the amount of retransmitted/lost uplink data blocks to the total amount of uplink data blocks. The MAC typically handles both HARQ and uplink power control.

In BBU 416, the network applications determine the individual Received Signal Strength (RSS) for 5GNR UE 501. For example, the PHY may process uplink 5GNR symbols to determine the RSS and signal the RSS to the MAC for uplink power control. The network applications determine the uplink throughput over the backhaul links for all served UEs. For example, the SDAP may measure the average bytes per second on the backhaul uplink to the UPF and signal the throughput metrics to the MAC for uplink power control.

The network applications determine an uplink power instruction for 5GNR UE 401 based on the uplink RSS, HARQ BLER, backhaul throughput, and possibly other factors like noise and interference. In particular, the MAC raises the transmit power for 5GNR UE 401 when the RSS goes down and lowers the transmit power for 5GNR UE 401 when the RSS goes up. The MAC usually targets the uplink RSS for all UEs at a common level and adjusts individual power levels to achieve the common RSS at 5GNR radio 415. The power adjustment based on the RSS is referred to herein as the signal factor. Thus, the network applications increase and decrease the uplink transmit power for 5GNR UE 401 by the signal factor based on the uplink RSS.

The network applications increase the transmit power level by an error factor when the HARQ BLER for 5GNR UE 401 increases. The network applications decrease the transmit power level by the error factor when the HARQ BLER for 5GNR UE 401 decreases. The network applications increase the transmit power level by a backhaul factor when the backhaul throughput increases. The network applications decrease the transmit power level by the backhaul factor when the backhaul throughput decreases. Other metrics could be used to control the uplink transmit power. For example, the network applications may increase the transmit power level by a noise/interference factor when the noise/interference increases and decrease the transmit power level by the noise/interference factor when the noise/interference decreases. The network applications in BBU 416 transfer the power instruction to 5GNR UE 401 over radio 415. 5GNR UE 401 controls its uplink transmit power in response to the power instruction.

5GNR access node 410 could be modified or supplemented to be an LTE access node, WIFI access node, and/or LP-WAN access node. The respective network applications for LTE, WIFI, and/or LP-WAN would be loaded into radio 415 and BBU 416.

Figure 5:
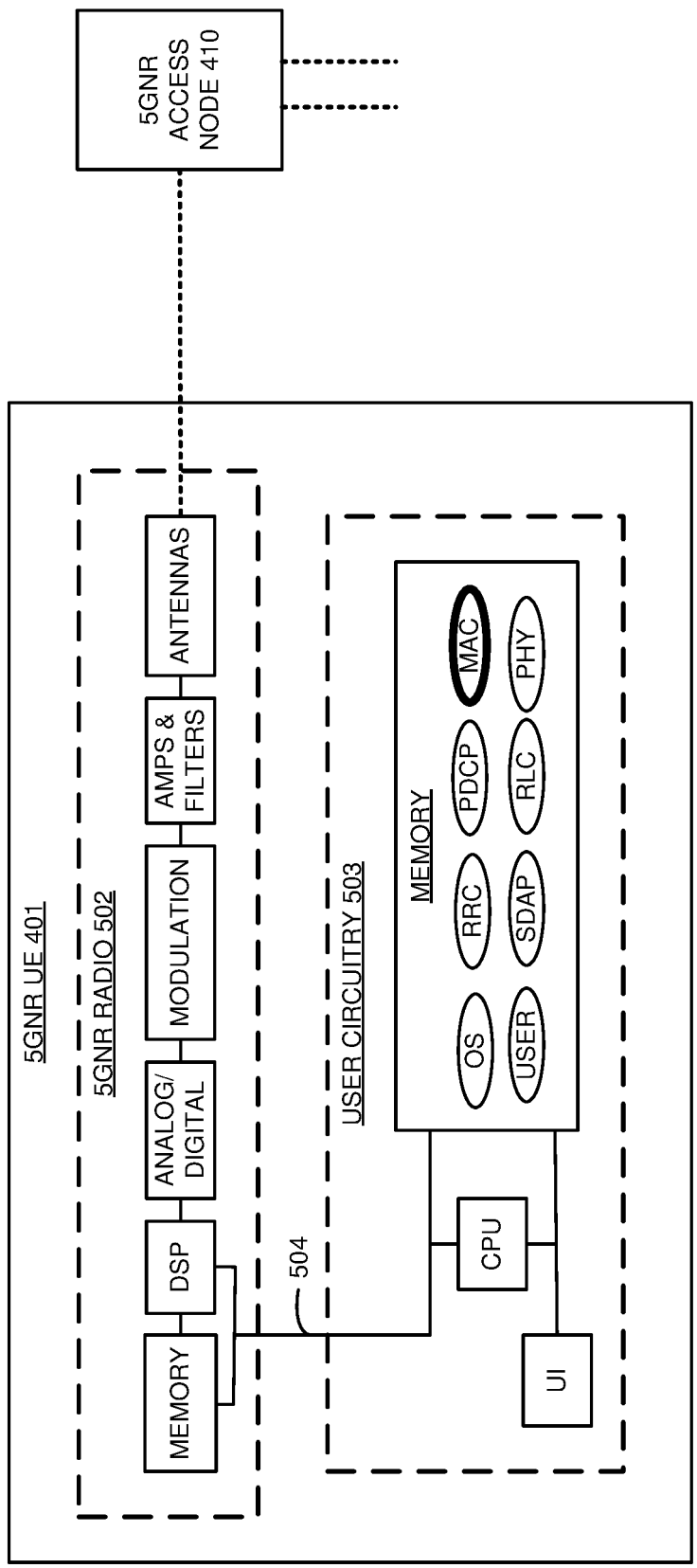
FIG. 5 illustrates a 5GNR UE that controls its uplink transmit power based on the uplink error rate and backhaul throughput.

FIG. 5 illustrates 5GNR UE 401 that controls its uplink transmit power based on the uplink error rate and backhaul throughput. 5GNR UE 401 is an example of wireless UEs 101-103, although UEs 101-103 may differ. UE 401 comprises 5GNR radio 502, and control circuitry 503 that are coupled over bus circuitry 504. 5GNR radios 502 comprises antennas, amps, filters, modulation, analog-to-digital interfaces, DSP, and memory that are coupled over bus circuitry. The antennas in 5GNR UE 401 are wirelessly coupled to the antennas in 5GNR access node 410. User circuitry 503 comprises user interfaces (UI), CPU, and memory. The memory in user circuitry 503 stores operating systems (OS), user applications (USER), and network applications for PHY, MAC, RLC, PDCP, SDAP, and RRC. The CPU executes the operating systems, user applications, and network applications to exchange signaling and data between the user applications and the network applications. The CPU executes the operating systems and network applications to wirelessly exchange corresponding 5GNR signaling and 5GNR data with 5GNR access node 410 over 5GNR radio 502.

In 5GNR radio 502, the antennas receive wireless signals from 5GNR access node 410 that transport downlink 5GNR signaling and downlink 5GNR data. The downlink 5GNR signaling includes uplink transmit power control instructions. The antennas transfer corresponding electrical downlink signals through duplexers to the amps. The amps boost the received downlink signals for filters which attenuate unwanted energy. In modulation, demodulators down-convert the downlink signals from their carrier frequencies. The analog/digital interfaces convert the analog downlink signals into digital downlink signals for the DSP. The DSP recovers downlink symbols from the downlink digital signals. The CPU executes the network applications to process the downlink symbols and recover the downlink 5GNR signaling and downlink 5GNR data. The network applications transfer the corresponding downlink data to the user applications over the operating systems. The downlink 5GNR signaling includes the transmit power instructions for the MAC.

The network applications receive uplink user signaling and data from the operating systems for the user applications. The network applications process the uplink user signaling and downlink 5GNR signaling to generate new downlink user signaling and new uplink 5GNR signaling. The network applications transfer new downlink user signaling and data to the operating systems for delivery to the user applications. The network applications process the new uplink 5GNR signaling and uplink 5GNR data to generate corresponding uplink symbols. The DSP processes the uplink symbols to generate corresponding digital signals for the analog-to-digital interfaces. The DSP also processes the power control instructions from the MAC to direct the amps. The analog-to-digital interfaces convert the digital uplink signals into analog uplink signals for modulation. Modulation up-converts the uplink signals to their carrier frequencies. The filters attenuate unwanted out-of-band energy and transfer the filtered uplink signals through the amps to the antennas. The amps boost the modulated uplink signals to the selected uplink transmit power levels per the MAC instructions. The electrical uplink signals drive the antennas to emit corresponding wireless signals that transport the new uplink 5GNR signaling and new uplink 5GNR data to 5GNR access node 410.

RRC functions comprise authentication, security, handover control, status reporting, QoS, network broadcasts and pages, and network selection. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In user circuitry 503, the network applications exchange 5GNR signaling with 5GNR access node 410 over 5GNR radio 502. The 5GNR signaling includes transmit power instructions. In response, the network applications transfer uplink data to 5GNR access node over 5GNR radio 502 at the uplink transmit power levels that are specified by the transmit power instructions. The network applications perform uplink HARQ error correction on the uplink data. The uplink HARQ error correction entails the network applications retransmitting data blocks that are requested or that are not acknowledged by 5GNR access node 410. In user circuitry 503, the MAC typically handles both HARQ and uplink power control.

5GNR UE 401 could be modified or supplemented to be an LTE UE, WIFI UE, and/or LP-WAN UE. The respective network applications for LTE, WIFI, and/or LP-WAN would be loaded into radio 502 and circuitry 503.

Figure 6:
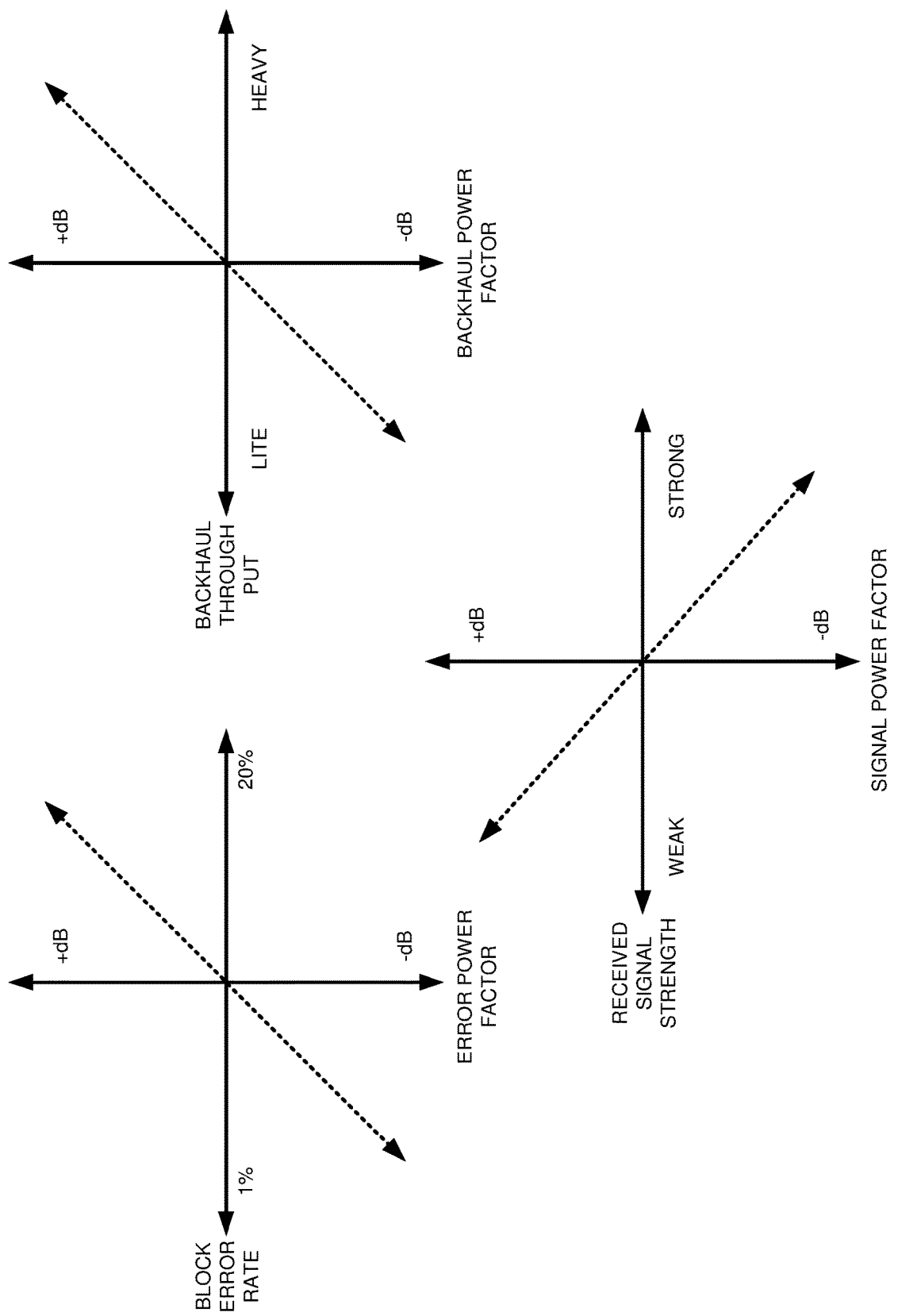
FIG. 6 illustrates the operation of the 5GNR access node to control the uplink transmit power of the wireless UE based on the uplink error rate and backhaul throughput.

FIG. 6 illustrates the operation of 5GNR access node 410 to control the uplink transmit power of 5GNR UE 401 based on the uplink error rate and backhaul throughput. FIG. 6 depicts three graphs. The bottom graph has received signal strength on the horizontal axis and signal power factor on the vertical axis. The top left graph has BLER on the horizontal axis and error power factor on the vertical axis. The top right graph has backhaul throughput on the horizontal axis and backhaul power factor on the vertical axis. The dotted lines on the graphs yield transmit signal strength adjustments for 5GNR UE 401. The graphs are usually reduced to data structures or algorithms that are hosted by BBU 416 in 5GNR access node 410.

5GNR access node 410 enters the data structure or algorithm for the bottom graph with the received signal strength to determine a signal power factor. When the received signal strength is strong, the signal power factor is negative decibels (dB), and when the received signal strength is weak, the signal power factor is positive decibels. 5GNR access node 410 enters the data structure or algorithm for the top left graph with the BLER to determine an error power factor. When the BLER is below 10% or so, the error power factor is negative decibels, and when the BLER signal strength is above 10% or so, the signal power factor is positive decibels. 5GNR access node 410 enters the data structure or algorithm for the top right graph with the backhaul throughput to determine a backhaul power factor. When the backhaul throughput is lite, the backhaul power factor is negative decibels, and when the backhaul throughput is above heavy, the backhaul power factor is positive decibels. Other graphs could be used to generate additional power factors like a noise graph and an interference graph.

5GNR access node 410 combines the signal power factor, BLER power factor, backhaul power factor, and other power factors (if any) to determine the transmit power instruction for 5GNR UE 401. For example, 5GNR access node 410 may add a signal power factor (−3 dB), a BLER power factor (+0.4 dB), a backhaul power factor (+0.3 dB), a noise power factor (+0.2 dB), and an interference power factor (+0.1 dB) to generate a transmit power instruction to reduce transmit power by 2 dB. In another example, 5GNR access node 410 may add a signal power factor (+3 dB), a BLER power factor (−0.7 dB), a backhaul power factor (−0.4 dB), a noise power factor (+0.3 dB), and an interference power factor (+0.2 dB) to generate a transmit power instruction to increase transmit power by 2.4 dB.

Figure 7:
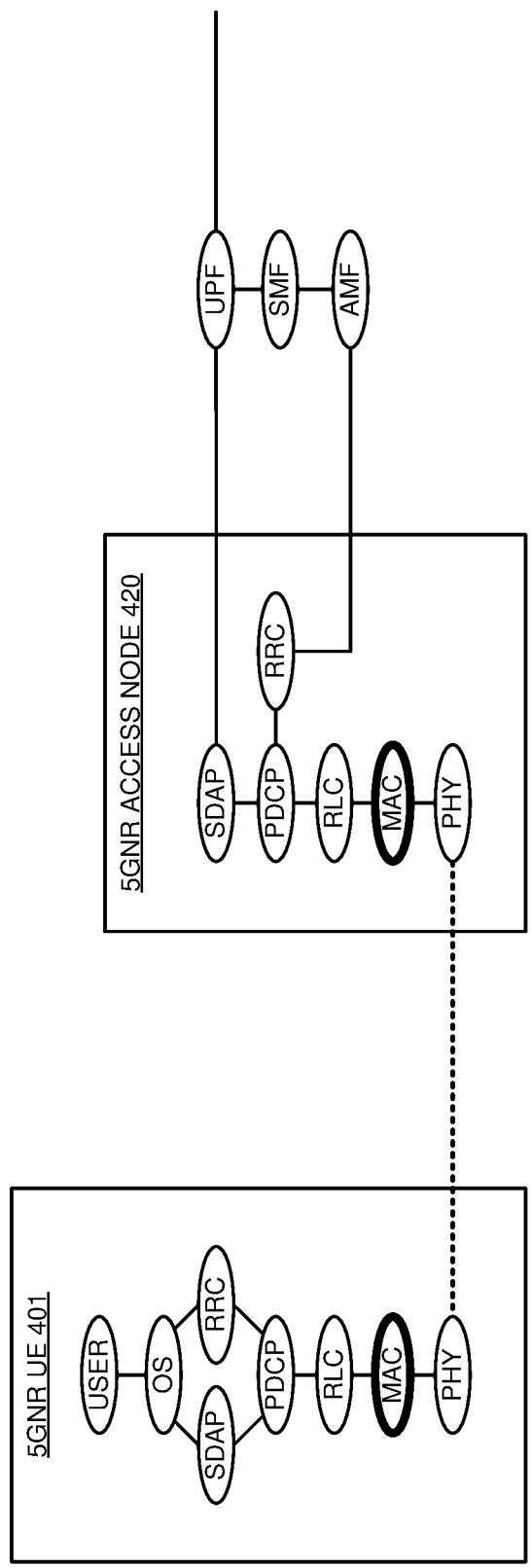
FIG. 7 illustrates the operation of the 5GNR access node and the 5GNR UE to control the uplink transmit power of the wireless UE based on the uplink error rate and backhaul throughput.

FIG. 7 illustrates the operation of 5GNR UE 401 and 5GNR access node 410 to control the uplink transmit power of 5GNR UE 410 based on the uplink error rate and backhaul throughput. In 5GNR UE 401 and 5GNR access node 410, the RRCs exchange 5GNR (including N1) signaling over their PDCPs, RLCs, MACs, and PHYs. In 5GNR access node 410, the RRC and AMF exchange N2/N1 signaling. The AMF signals the SDF to direct the UPF to serve one or more data bearers to 5GNR UE 401. In 5GNR UE 401, the user applications transfer user data to the operating systems, and the operating systems signal the RRC to transfer the user data to a destination. The SDAP transfers the user data to the SDAP in 5GNR access node 410 over their PDCPs, RLCs, MACs, and PHYs. The SDAP in 5GNR access node 410 transfers the user data to the UPF over one or more data bearers. The UPF transfers at least some of the user data to external systems.

In 5GNR access node 410, the PHY determines the uplink Received Signal Strength (RSS), noise, and interference for 5GNR UE 401. The PHY signals the uplink RSS, noise, and interference to the MAC. The MAC in 5GNR access node 410 performs HARQ and determines uplink BLER. The SDAP in 5GNR access node 410 determines backhaul throughput and signals the uplink backhaul throughput to the MAC. The MAC in 5GNR access node 410 processes the uplink RSS, noise, interference, BLER, and backhaul throughput to determine a transmit power instruction for 5GNR UE 401. The MAC initially adjusts the uplink RSS by the signal power factor, noise power factor, and interference power factor to determine a transmit power adjustment for 5GNR UE 401 to achieve the target RSS. The MAC then adjusts the uplink RSS by the error power factor and the backhaul power factor to generate the transmit power instruction. The MAC in 5GNR access node 410 transfers the power instruction to the MAC 5GNR UE 401 over their PHYs. The MAC in 5GNR UE 401 adjusts the uplink transmit power per the transmit power instruction.

The wireless data network circuitry described above comprises computer hardware and software that form special-purpose network circuitry to control the uplink transmit power of UEs based on uplink error rate. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control the uplink transmit power of UEs based on uplink error rate.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to control transmit power of wireless User Equipment (UEs), the method comprising:
    determining individual uplink signal strengths for individual ones of the wireless UEs;
    determining individual uplink error rates for the individual ones of the wireless UEs;
    determining individual power instructions for the individual ones of the wireless UEs based on the individual uplink signal strengths and the individual uplink error rates; and
    transferring the individual power instructions to the individual ones of the wireless UEs, wherein the individual ones of the wireless UEs control their transmit power responsive to the individual power instructions.

2. The method of claim 1 further comprising:
    determining individual uplink noise levels for the individual ones of the wireless UEs; and wherein
    determining the individual power instructions for the individual ones of the wireless UEs comprises determining the individual power instructions for the individual ones of the wireless UEs based on the individual uplink noise levels, the individual uplink signal strengths, and the individual uplink error rates.

3. The method of claim 1 further comprising:
    determining individual uplink interference levels for the individual ones of the wireless UEs; and wherein
    determining the individual power instructions for the individual ones of the wireless UEs comprises determining the individual power instructions for the individual ones of the wireless UEs based on the individual uplink interference levels, the individual uplink signal strengths, and the individual uplink error rates.

4. The method of claim 1 further comprising:
    determining individual backhaul throughputs for the individual ones of the wireless UEs; and wherein
    determining the individual power instructions for the individual ones of the wireless UEs comprises determining the individual power instructions for the individual ones of the wireless UEs based on the individual backhaul throughputs, the individual uplink signal strengths, and the individual uplink error rates.

5. The method of claim 1 wherein:
    determining the individual uplink error rates for the individual ones of the wireless UEs comprises determining Hybrid Automatic Repeat Request (HARQ) Block Error Rates (BLERs); and
    determining the individual power instructions for the individual ones of the wireless UEs comprises determining the individual power instructions based on the individual uplink signal strengths and the individual uplink HARQ BLERs.

6. The method of claim 1 wherein determining the individual power instructions for the individual ones of the wireless UEs comprises determining individual decibel level adjustments.

7. The method of claim 1 wherein the wireless UEs comprise vehicles.

8. A non-transitory computer-readable media comprising instructions that direct circuitry to control transmit power of wireless User Equipment (UEs) by performing a method that comprises:
    determining individual uplink signal strengths for individual ones of the wireless UEs;
    determining individual uplink error rates for the individual ones of the wireless UEs;
    determining individual power instructions for the individual ones of the wireless UEs based on the individual uplink signal strengths and the individual uplink error rates; and
    transferring the individual power instructions to the individual ones of the wireless UEs, wherein the individual ones of the wireless UEs control their transmit power responsive to the individual power instructions.

9. The non-transitory computer-readable media of claim 8 wherein the circuitry comprises Fifth Generation New Radio (5GNR) Baseband Unit (BBU) circuitry.

10. The non-transitory computer-readable media of claim 8 wherein:
    determining the individual uplink error rates for the individual ones of the wireless UEs comprises determining Hybrid Automatic Repeat Request (HARQ) Block Error Rates (BLERs); and
    determining the individual power instructions for the individual ones of the wireless UEs comprises determining the individual power instructions based on the individual uplink signal strengths and the individual uplink HARQ BLERs.

11. The non-transitory computer-readable media of claim 8 wherein determining the individual power instructions for the individual ones of the wireless UEs comprises determining individual decibel level adjustments.

12. The non-transitory computer-readable media of claim 8 further comprising:
   determining individual uplink noise levels for the individual ones of the wireless UEs; and wherein
   determining the individual power instructions for the individual ones of the wireless UEs comprises determining the individual power instructions for the individual ones of the wireless UEs based on the individual uplink noise levels, the individual uplink signal strengths, and the individual uplink error rates.

13. The non-transitory computer-readable media of claim 8 further comprising:
   determining individual uplink interference levels for the individual ones of the wireless UEs; and wherein
   determining the individual power instructions for the individual ones of the wireless UEs comprises determining the individual power instructions for the individual ones of the wireless UEs based on the individual uplink interference levels, the individual uplink signal strengths, and the individual uplink error rates.

14. The non-transitory computer-readable media of claim 8 further comprising:
   determining individual backhaul throughputs for the individual ones of the wireless UEs; and wherein
   determining the individual power instructions for the individual ones of the wireless UEs comprises determining the individual power instructions for the individual ones of the wireless UEs based on the individual backhaul throughputs, the individual uplink signal strengths, and the individual uplink error rates.

15. A wireless access node to control transmit power of wireless User Equipment (UEs), the wireless access node comprising:
   a radio to wirelessly receive uplink signals from the wireless UEs;
   a Baseband Unit (BBU) to determine individual uplink signal strengths for individual ones of the wireless UEs based on the uplink signals;
   the BBU to determine individual uplink error rates for the individual ones of the wireless UEs based on the uplink signals;
   the BBU to determine individual power instructions for the individual ones of the wireless UEs based on the individual uplink signal strengths and the individual uplink error rates; and
   the radio to wirelessly transfer the individual power instructions to the individual ones of the wireless UEs, wherein the individual ones of the wireless UEs control their transmit power responsive to the individual power instructions.

16. The wireless access node of claim 15 wherein the BBU comprises:
   a Physical Layer (PHY) to determine the individual uplink signal strengths for the individual ones of the wireless UEs based on the uplink signals; and
   a Media Access Control (MAC) to determine the individual uplink error rates for the individual ones of the wireless UEs based on the uplink signals.

17. The wireless access node of claim 15 wherein the BBU comprises a Media Access Control (MAC) to determine the individual power instructions for the individual ones of the wireless UEs based on the individual uplink signal strengths and the individual uplink error rates.

18. The wireless access node of claim 15 further comprising:
   the BBU to determine individual uplink noise levels for the individual ones of the wireless UEs; and wherein
   the BBU is to determine the individual power instructions for the individual ones of the wireless UEs based on the individual uplink noise levels, the individual uplink signal strengths, and the individual uplink error rates.

19. The wireless access node of claim 15 further comprising:
   the BBU to determine individual uplink interference levels for the individual ones of the wireless UEs; and wherein
   the BBU is to determine the individual power instructions for the individual ones of the wireless UEs based on the individual uplink interference levels, the individual uplink signal strengths, and the individual uplink error rates.

20. The wireless access node of claim 15 further comprising:
   the BBU to determine individual backhaul throughputs for the individual ones of the wireless UEs; and wherein
   the BBU is to determine the individual power instructions for the individual ones of the wireless UEs based on the individual backhaul throughputs, the individual uplink signal strengths, and the individual uplink error rates.

* * * * *